(No Model.)

S. B. GILLILAND.
HORSE HAY RAKE.

No. 337,574. Patented Mar. 9, 1886.

WITNESSES.
C. J. Schneider.
Rota McGill.

INVENTOR.
Samuel B. Gilliland
By Myers & Co.
ATTORNEYS.

UNITED STATES PATENT OFFICE.

SAMUEL B. GILLILAND, OF MONROE CITY, MISSOURI.

HORSE HAY-RAKE.

SPECIFICATION forming part of Letters Patent No. 337,574, dated March 9, 1886.

Application filed March 18, 1885. Serial No. 159,268. (No model.)

*To all whom it may concern:*

Be it known that I, SAMUEL B. GILLILAND, a citizen of the United States of America, residing at Monroe City, in the county of Monroe and State of Missouri, have invented certain new and useful Improvements in Horse Hay-Rakes, of which the following is a specification, reference being had therein to the accompanying drawings.

This invention pertains to horse hay-rakes of that class wherein the implement or rake is moved with the horse or animal hitched to the rear head foremost, the same having for its object to permit the ready turning and guiding of the rake, and to enable the accommodation thereof to the unevenness of the ground, while it is simple and easily contrived.

The invention consists of the combinations of parts and their construction, substantially as hereinafter fully set forth, and pointed out in the claims.

Figure 1:
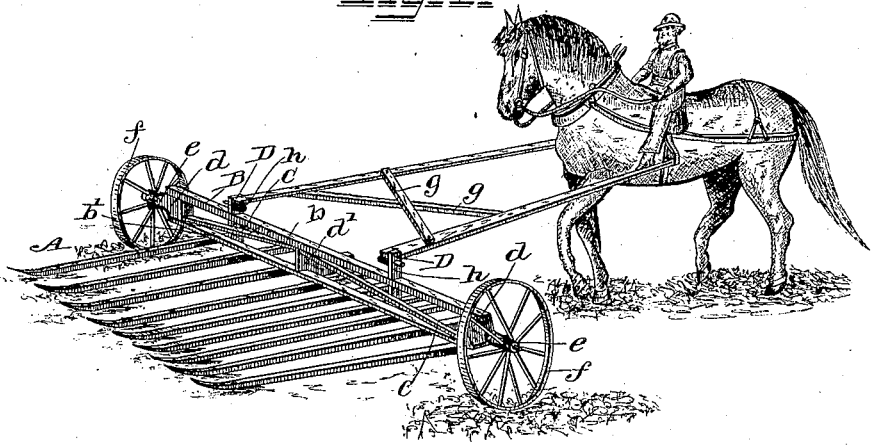
Figure 2:
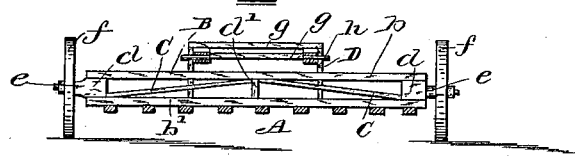
Figure 3:
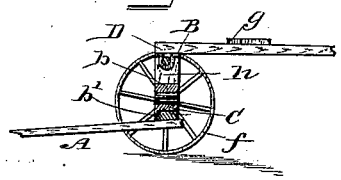

In the accompanying drawings, Figure 1 is a perspective view of my rake with the horse or animal hitched thereto. Fig. 2 is a section of the rake, taken transversely through the rake-teeth, viewing the rake-head from the front, the thill connections or couplings also being shown in section; and Fig. 3 is a cross-section of the rake-head, with a rake-tooth and a thill connection or coupling in side view.

In the embodiment of my invention I construct the rake with a series of teeth, A, having their outer forward ends or points beveled upon the under side and slightly curved upward, to prevent the same entering or penetrating the ground in their movement, the rear inner ends of said teeth being fastened to the lower side of the rake-head B. The said rake-head comprises an upper horizontal bar, $b$, and a lower similarly-disposed bar, $b'$, secured at their ends to the upper and lower sides, respectively, of two blocks or cross-heads, $d$, to which latter are connected short axles $e$, bearing wheels $f$, for the elevation of the rear ends of the teeth and the easy movement of the rake. Between and to the center of the said bars of the rake-head B is fastened a third cross-head, $d'$, against the sides of which at its upper end abut the upper adjacent ends of two diagonal braces, C, which are interposed between the bars $b\ b'$ of the rake-head, and having their distant or outer ends bearing or abutting against the inner sides of the end cross-heads or blocks, $d$, at the lower ends of the latter, thus rendering the rake-head strong and perfectly rigid as against sagging, while it possesses lightness and is inexpensive.

D D are the shafts or thills, which are connected to the rake-head at its rear side, to permit the moving of the rake, with the horse or animal hitched to the rear side of the same head foremost, imparting thereby a pushing motion to the rake to gather or rake up the hay or straw to be transported or carried by the rake to the point of stacking the same. These shafts or thills, which are braced rigidly together by crossing bars or braces $g$ near their inner ends, are hinged or coupled at said inner ends either directly to the upper bar of the rake-head, or, as shown in the present instance, to short uprights or bars $h$, fastened to said rake-head, being coupled or hinged in the manner shown or otherwise, whereby the rake can accommodate itself to the unevenness of the ground without affecting the shafts or thills. The shafts or thills may be connected to the tugs of the harness of the horse or animal at the point shown, or the shafts may extend to the rear of the horse, so as to be pulled from the extended end of the tug, while said shafts or thills are disposed a sufficient distance apart to permit the horse or animal to place his body at such an angle thereto, without contact with the ends of the shafts, as to enable the ready turning or guiding of the rake.

Having thus fully described my invention, what I claim, and desire to secure by Letters Patent, is—

1. In a horse hay-rake, the combination, with the rearwardly-extending shafts or thills, of the rake-head having the upper and lower horizontal bars, and the two diagonal bars, the cross-heads secured between said horizontal bars having short axles, and the uprights or bars having the said shafts or thills connected thereto, substantially as shown and described.

2. The combination, with the short uprights or bars having the rearwardly-extended shafts or thills connected thereto, of the cross-heads having short axles, and the horizontal bars connected to the upper and lower sides thereof, substantially as shown and described.

In testimony whereof I affix my signature in presence of two witnesses.

SAMUEL B. GILLILAND.

Witnesses:
W. R. P. JACKSON,
J. T. UMSTATTD.